J. S. GOLD.
SPLINT BASKET.
APPLICATION FILED NOV. 20, 1913.
1,163,003.
Patented Dec. 7, 1915.
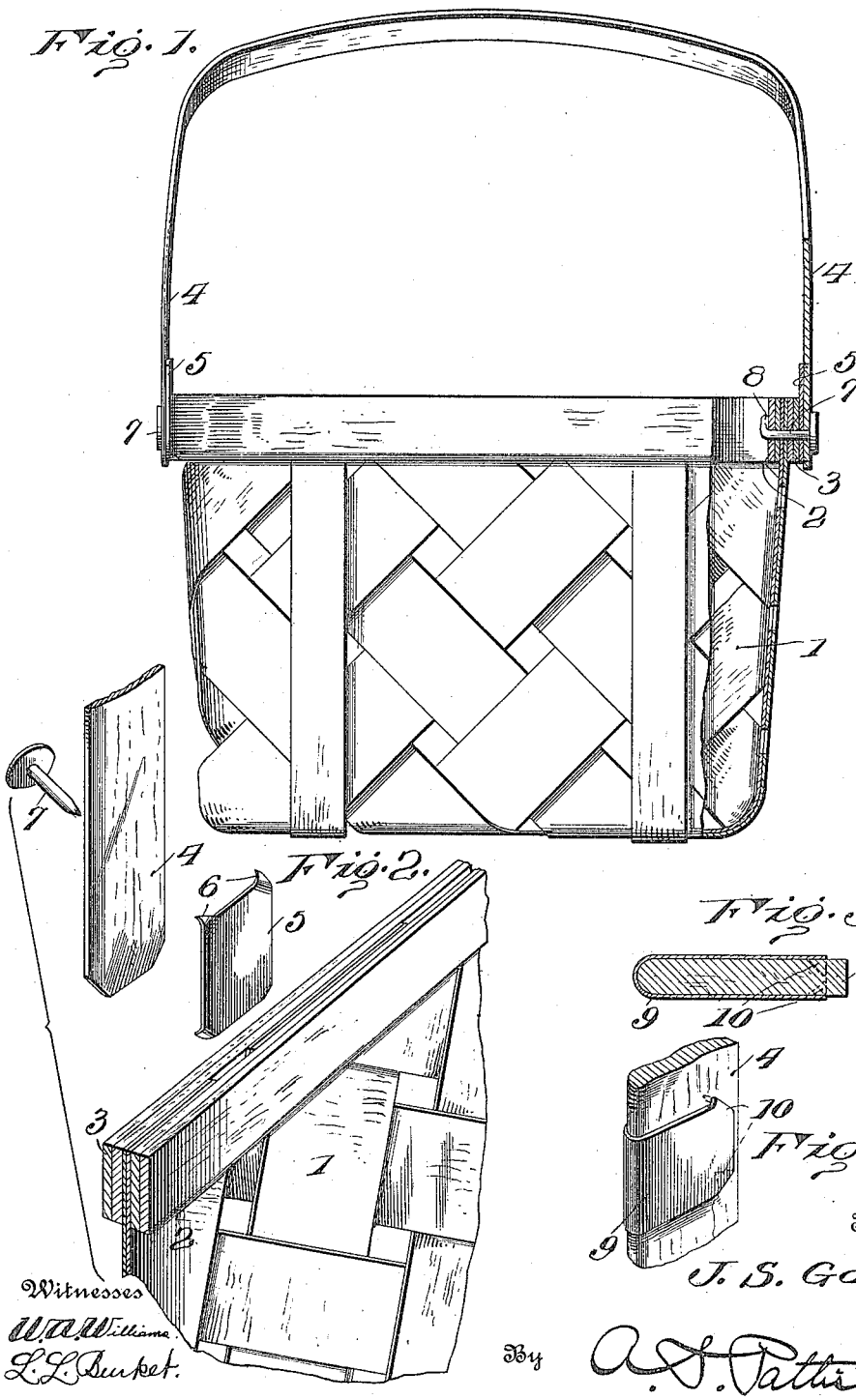
Witnesses
W. A. Williams
L. L. Burket
Inventor
J. S. Gold,
By A. S. Patton
Attorney
COLUMBIA PLANOGRAPH CO., WASHINGTON, D. C.

UNITED STATES PATENT OFFICE.

JOSEPH S. GOLD, OF JACKSON, OHIO.

SPLINT BASKET.

1,163,003.  Specification of Letters Patent.  Patented Dec. 7, 1915.

Application filed November 20, 1913. Serial No. 802,139.

*To all whom it may concern:*

Be it known that I, JOSEPH S. GOLD, a citizen of the United States, residing at Jackson, in the county of Jackson and State of Ohio, have invented certain new and useful Improvements in Splint Baskets, of which the following is a specification, reference being had therein to the accompanying drawing.

My invention relates to improvements in splint baskets.

The object of my invention is to provide means whereby a bail of a splint basket may be readily and more securely fastened to the basket and at the same time providing means for allowing the more ready swinging of the bail downward.

Another object of my invention is to provide a simple, cheap and more effective manner of mounting the bail on the basket and having certain details of structure hereinafter more fully described.

In the accompanying drawings—Figure 1 is an end view, of a splint basket showing in section the pivotal connection of one end of the bail. Fig. 2 is a perspective view of a portion of the basket showing the lower portion of the bail and the metal plate before applied. Fig. 3 is a transverse sectional view of the bail showing a modified form of metal plate. Fig. 4 is a perspective view of the lower end of the bail showing the modified form of metal plate.

In splint baskets of the type shown in this invention where the bail is usually about one eighth of an inch thick, it has heretofore been necessary to pivot the bail some distance from its lower end, to prevent the forcing of the pivot therethrough from splitting the bail. This as will be readily understood leaves an extension below the pivot which catches into the user's clothes and has been found very objectionable. In this form the bail often splits while driving the pivot or by the weight of the basket thereon and thus the bail breaks loose from the body of the basket and the basket becomes useless.

Referring now to the drawings 1 represents the basket which is of the well known form and which needs no further description except that the upper end thereof is formed with binding strips 2 and 3 on the inside and outside to strengthen the basket. The outside strip 3 forms a bearing against which the bail bears and turns as clearly shown. The bail 4 is of the usual structure and is provided at its lower end with a plate 5 which has its corners turned laterally at 6 and driven into the bail. These lateral corners are set at an angle to the grain of the wood of the bail. This plate as shown is on the inside of the bail and bears against the outer face of the outside binding strip 3 and thus forms a bearing which allows the handle to be swung more freely as metal working against wood moves easier than wood working against wood.

The pivot 7 as shown in the drawings is in the form of a nail and is driven through the bail 4 and the plate 5 and through the two binding strips 2 and 3 and clenched as shown in Fig. 1 and indicated by the reference character 8. By this structure it will be seen that the bail can be pivoted close to its lower end without splitting the same and at the same time form a stronger bearing surface for the pivot. Baskets of this character have to be made light and cheap and the addition of the plate 5 adds very little to the cost and not only forms a stronger basket but also obviates the great objections in the extension of the bail as is now necessary in the manufacture of baskets.

In the modification shown in Figs. 3 and 4 the plate is formed of a looped piece of metal 9 extending on both sides of the bail and has its ends bent inwardly at 10 to form securing means therefor.

Having thus fully described my invention what I claim and desire to secure by Letters Patent is:

1. A basket of the character described, comprising a body portion, a bail, a plate having laterally turned driving ears driven into the bail adjacent its lower end on the inside, and a pivot driven through the bail from the outside and through the plate and body portion, and clenched on the inside of the said body portion.

2. A basket of the character described comprising a body portion, a bail, a looped plate passing around the side of the bail and extending over the inner and outer faces thereof adjacent its lower end, and having its ends turned laterally and driven into the said opposite faces of the bail and a nail driven through the outer wall of the plate, bail and the inner wall of the plate and the body portion, and clenched on the inside of the body portion.

3. A basket of the character described, comprising a body-portion, a bail, a looped plate passing around the side of the bail and extending over the inner and outer faces thereof at its lower end and having its ends turned laterally and driven into the said opposite faces of the bail and a pivot driven through the outer wall of the plate, the bail and the inner wall of the plate and through the body of the basket and secured on the inside, substantially as shown and described.

4. A basket of the character described, comprising a body-portion, a bail, a looped-plate passing around the side of the bail adjacent its lower end and extending over the inner and outer faces thereof and having its ends turned laterally and driven into the opposite faces of the bail and a nail driven through the plate from the outside of the bail through the bail and through the plate on the inside of the bail and through the upper portion of the basket and clenched on the inside of the body-portion of the basket, for the purpose described.

5. A basket of the character described comprising a body portion, a bail, a looped plate passing around the side of the bail adjacent its lower end and extending over the inner and outer faces thereof, means for securing the looped plate to the bail, and a nail driven through the plate from the outside of the bail through the bail and through the plate on the inside of the bail and through the upper portion of the basket and clenched on the inside of the body portion of the basket, for the purpose described.

In testimony whereof I hereunto affix my signature in the presence of two witnesses.

JOSEPH S. GOLD.

Witnesses:
H. C. MILLER,
CHARLES F. STEELE.

Copies of this patent may be obtained for five cents each, by addressing the "Commissioner of Patents, Washington, D. C."